United States Patent Office 2,889,244
Patented June 2, 1959

2,889,244

METHOD AND COMPOSITION FOR IMPROVING THE PLANT GROWING PROPERTIES OF SOIL

Charles R. Youngson, Long Beach, Calif., assignor to The Dow Chemical Company, Midland, Mich., a corporation of Delaware No Drawing. Application April 5, 1957
Serial No. 650,870

8 Claims. (Cl. 167—22)

The present invention relates to the culture and protection of crops and is particularly concerned with a new method and composition for the control of soil dwelling invertebrates which attack plant roots and for the improvement of the emergence, seedling growth and harvest of crop plants.

It is an object of the present invention to provide a new agronomic practice for improving the plant growing properties of soil and the ability of soil to support plant growth. An additional object is the provision of a new agronomic practice for improving the growth characteristics of plants, and stimulating the growth of crops. A further object is the provision of a new and improved method for the fumigation and disinfection of soil infested with nematodes and other invertebrates which attack plant roots. Another object is the provision of a novel composition to be employed in the new agronomic practice and method of fumigating soil. Other objects will become apparent from the following specification and claims.

According to the present invention it has been discovered that the plant growing properties of soil may be improved by treating the soil with an ether compound having the formula

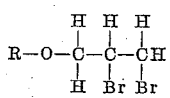

In this and succeeding formulae, R represents lower alkyl, allyl or propargyl. The expression lower alkyl is employed in the present specification and claims to refer to the alkyl radicals containing not to exceed 3 carbon atoms. Further it has been found that such treatment and impregnation controls the soil inhabiting invertebrates which attack the underground parts of plants and stimulates the growth and improves the growth characteristics of plants. Thus, for example, crop plants raised on the treated soil have more luxuriant tops and roots and are of a greater total weight than those normally obtained from untreated soil. The ether compounds as employed in accordance with the present invention are liquid materials somewhat soluble in many organic solvents and of low solubility in water and are adapted readily and conveniently to be distributed in the soil or growth media. When so distributed, the compounds accomplish a rapid control of root attacking invertebrate organisms such as nematodes. It is among the advantages of the present invention, that the compounds permeate growth media for a short distance from the point of application depending upon the temperature, moisture content, compactness and physical consistency of the media. It is a further advantage that the compounds are sufficiently persistent to accomplish the desired effect upon the soil but dissipate therefrom in a reasonable period of time.

The distribution in soil or growth media of a dosage of the ether compounds effective to improve the plant growing properties of the soil is essential for the practice of the present invention. For the control of nematodes, good results are obtained when a parasiticidal concentration of the compounds is distributed in the growth media. In general, good results are obtained when the compounds are distributed through the growth media in an amount of from about 2 to 150 parts or more by weight per million parts by weight of the medium. In field applications, the ether compounds may be distributed in the soil at a dosage of from 2.0 to 250 pounds or more per acre and through such a cross-section of the soil to provide for the presence therein of an effective concentration of the treating agent. In general field applications, it is usually preferred that the compounds be distributed to a depth of at least 4 inches. When the treatment is carried out by injection or drilling technique, it is preferred that the maximum distance between deposits be not in excess of from about 8 to about 15 inches. In row treatment of existing vegetation resistant to the ether compounds, the products may be employed in accordance with known suitable side-dressing techniques. Oftentimes, it is desirable to distribute the compounds to a depth of 24 inches or more to avoid reinfestation of the soil from deep-dwelling organisms.

In one embodiment of the invention, the treated soil is planted with the desired crop plant following the distribution of the ether compounds in the soil. Where minimum dosages of the ether compounds are distributed in soil, the treated soil may be immediately planted with the desired crop. Following the distribution of larger dosages, it is desirable that any planting operation not be carried out for a period of from several hours to several days, the exact period depending upon the concentration of the ether compound in the soil and the resistance of the species concerned to the compound. Where the compounds are employed for the treatment of the soil adjacent to the root systems of established plants having resistance to the ether compounds and in side-dressing operations, the existing vegetation is not unfavorably effected by minimum effective concentrations of the ether compounds temporarily present in the soil.

The method of the present invention may be carried out by distributing the unmodified ether compounds through the growth media as by impregnation. However, the present method also embraces the employment of a liquid or dust composition containing the toxicants. In such usage, the ether compounds may be modified with one or more of a plurality of additaments or soil treating or parasiticide adjuvants, including water or inert organic solvents, surface active dispersing agents or finely divided inert solids. Depending upon the concentration of toxicant, such augmented compositions are adapted to be distributed in the soil, or employed as concentrates and subsequently diluted with additional inert carrier to produce the ultimate treating compositions. The required amount of the ether compounds in the growth media conveniently may be supplied per acre treated in from 10 to 27,000 gallons or more of the aqueous carrier, in from 1 to 50 gallons of organic solvent carrier, or in from about 20 to 2000 pounds or more of the solid carrier.

The exact concentration of the ether compounds to be employed in compositions for the treatment of the growth media is not critical and may vary provided the required dosage of effective agent is supplied in the soil. The concentration of toxicant in organic solvent compositions employed to supply the desired dosage is generally from about 10 to 85 percent by weight. With aqueous compositions, the required dosage is generally supplied with compositions containing 0.1 to 50 percent by weight, although concentrations of 0.0001 percent by weight conveniently may be employed in irrigation treatments of soil. In dusts, the concentrations of toxicant may be from 1 to 50 percent by weight, although concentrations as low as 0.1 percent by weight are sometimes employed. In compositions to be employed as concentrates, the toxicant oftentimes is present in a concentration of from 5 to 95 percent by weight.

Liquid compositions containing the desired amount of the ether compounds may be prepared by dissolving the toxicant compounds in an organic liquid such as acetone, toluene, methylene chloride, chlorobenzene and petroleum distillates, or by dispersing the compounds in water with the aid of a suitable surface active dispersing agent such as an ionic or non-ionic emulsifying agent. The preferred organic solvent carriers are those which are adapted to accomplish the penetration and impregnation of the soil with the ether compounds, and are of such volatility that they evaporate from the soil and leave little permanent residue therein. Particularly desirable carriers in this group are the petroleum distillates boiling almost entirely under 400° F. at atmospheric pressure and having a flash point above about 80° F. Compositions comprising the ether compounds and these petroleum distillates constitute preferred embodiments of the present invention.

The aqueous compositions may contain one or more water-immiscible solvents for the ether compounds. In such compositions the carrier comprises an aqueous emulsion, that is, a mixture of water-immiscible solvent, emulsifying agent and water. The choice of dispersing and emulsifying agent and the amount thereof employed is dictated by the nature of the composition type and by the ability of the agent to facilitate the dispersion of the ether compounds in the aqueous carrier to produce the desired composition. The surface-active dispersing agents are generally employed in the amount of from 1 to 20 percent by weight of the combined weight of the agent and ether compound in the composition. Dispersing and emulsifying agents which may be employed in the compositions include the condensation products of alkylene oxides with phenols and organic acids, alkyl aryl sulfonates, polyoxyethylene derivatives of sorbitan esters, complex ether alcohols, mahogany soaps and the like.

In the preparation of dust compositions, the ether compounds are dispersed in and on a finely divided inert solid such as talc, chalk, gypsum and the like. In such operations, the carrier is mechanically ground with the compounds or wet with a volatile organic solvent solution thereof. Similarly, dust compositions containing the compounds may be prepared from various of the solid surface active dispersing agents, such as bentonite, fuller's earth, attapulgite and other clays. Depending upon the proportions of ingredients, these dust compositions may be employed as concentrates and subsequently diluted with additional solid surface-active dispersing agents or with talc, chalk or gypsum and the like to obtain the desired amount of active ingredient in a composition adapted to be employed for the treatment of soil. Also such concentrate dust compositions may be dispersed in water with or without the aid of a dispersing agent to form aqueous soil treating compositions.

A further preferred embodiment of the present invention is a novel composition comprising soil in admixture with an effective concentration of the ether compounds.

When operating in accordance with the present invention, the soil or growth media may be impregnated with the ether compounds or a composition containing the toxicants in any convenient fashion, for example, by simple mixing with the soil or growth media, by employing a liquid carrier to accomplish the penetration and impregnation, or by injection or drilling techniques whereby the toxicant is deposited beneath the surface of the soil. In general, it is desirable that the distribution be carried out at a soil temperature of 45° F. or higher since the effectiveness of the ether compounds may be somewhat reduced at lower temperatures.

In a preferred embodiment, the method of the present invention is carried out in soil having a moisture content of from about 40 to 100 percent of the moisture equivalent of the soil. When operating under such soil conditions, maximum improvements in the plant growing properties of soil, crop yields and controls of invertebrates are obtained. L. M. Thompson, in "Soils and Fertility," McGraw-Hill Book Co. Inc. (1952), defines the moisture equivalent of a soil as equal to the percentage of water retained by wet soil after being centrifuged at 1000 times gravity. This equivalent is about the same as the so-called field capacity which may be defined as the moisture condition of the soil when downward movement into the soil has virtually ceased. This moisture equivalent or field capacity is dependent primarily upon the percentage of organic matter in the soil, the size of the soil particles and the porosity of the soil.

In a further method, the distribution may be accomplished by introducing the toxicant in the water employed to irrigate the soil. In such procedure, the amount of water may be varied in accordance with the moisture content and the moisture equivalent or field capacity of the soil in order to obtain the desired depth of distribution of the toxicants at a soil moisture content equal to the moisture equivalent. In such method, the ether compounds readily and conveniently may be distributed to a depth of from two to four feet or more to avoid reinfestation from deep-dwelling organisms.

The expressions "growth media" and "soil" are employed in the present specification and claims in their broadest sense to be inclusive of all conventional "soils," as defined in Webster's New International Dictionary, Second Edition, Unabridged, published in 1937 by G. and C. Merriam Company, Springfield, Massachusetts. Thus, the terms refer to any solid substances or media in which vegetation may take root and grow, and are intended to include not only earth but compost, manure, muck, humus, and sand and the like, adapted to support plant growth.

The following examples illustrate the invention but are not to be construed as limiting the same.

*Example 1*

An acetone solution containing 50 grams of 2,3-dibromo-propyl methyl ether per liter was employed for the treatment of sandy loam soil heavily infested with root-knot nematodes. At the time of treatment, the soil moisture content was about 10 percent, the latter being about 50 percent of the field capacity of the soil. In the treating operations, the soil was placed in sealable containers and injected with the composition in an amount sufficient to supply 50 pounds of 2,3-dibromopropyl methyl ether per acre-foot of soil. This corresponds to a concentration of 12.5 parts by weight of the 2,3-dibromopropyl methyl ether per million parts by weight of soil. Following the treatment, the containers were sealed and thereafter set aside at the average temperature of 22° C. In a check operation, sealed containers containing the same infested but untreated soil were exposed to identical conditions as the treated soil.

After one week, the containers were opened and aerated for one week and portions of the treated and untreated soil thereafter planted with tomato seeds. During the subsequent growing period, there was observed no adverse effects upon germination and growth of the seeds and emerging seedlings attributable to the ether compound. Thirteen weeks after seeding, the plants were lifted from the soil, their roots washed and the latter examined for galls attributable to nematode attack. The examination of the plants indicated that a 100 percent control of nematodes had been obtained in the treated soil. At the time of the observation, the plants from the untreated check soil were found to have their roots covered with galls attributable to nematode attack.

Example 2

Fifty parts by weight of 2,3-dibromopropyl ethyl ether, 45 parts by weight of xylene and 5 parts by weight of a dimeric alkylated aryl polyether alcohol (Triton X-155) are mixed together to prepare a concentrate composition in the form of an emulsifiable liquid.

Also, 90 parts by weight of 2,3-dibromopropyl propyl ether, and 10 parts by weight of a sorbitan monolaurate polyoxyethylene derivative (Tween 20) are mechanically mixed together to prepare a water dispersible concentrate composition.

There compositions are adapted to be dispersed in water to produce aqueous compositions having very desirable wetting and penetrating properties. The latter compositions are adapted to be employed to treat soil and distribute the ether compounds therein in effective concentrations.

Example 3

2,3-dibromopropyl methyl ether was dissolved in acetone to prepare compositions containing 12.5, 6.25 and 3.12 grams of the ether compound per liter. These compositions were employed in the manner as described in Example 1 for the treatment of sandy loam soil heavily infested with root-knot nematodes. In the treating operations, the soil was placed in sealable containers and injected with the compositions at dosages of 25, 12.5 and 6.25 pounds, respectively, per acre-foot of soil. These dosages correspond to concentrations of 6.2, 3.1 and 1.5 parts by weight, respectively, per million parts by weight of soil. Following the treatment the containers were sealed and set aside at the temperature of 22° C. In a check operation, sealed containers containing the same infested but untreated soil were exposed to identical conditions as the treated soil.

After one week, the containers were opened and aerated for one week. Thereafter, portions of the treated and untreated soil were planted with tomato seeds. During the subsequent growth period, no adverse effect upon germination of the seeds and emerging seedlings attributable to the ether compound was observed. Eight weeks after planting, the plants were lifted from the soil, their roots washed and the latter examined for galls attributable to nematode attack. The results of such examination are tabulated in the following table.

| Dosage of Toxicant Compound in Pounds Per Acre Foot of Soil | Percent Control of Nematodes |
|---|---|
| 25.0 | 100 |
| 12.5 | 100 |
| 6.25 | 84 |
| 0 | 0 |

At the time of observation, the plants from the untreated check soil were found to have their roots covered with galls attributable to nematode attack.

Example 4

2,3-dibromopropyl propargyl ether is dissolved in a petroleum hydrocarbon fraction (Stoddard's solvent) to produce a composition having a flash point greater than 100° F. and containing about 0.55 pound of toxicant per 100 gallons of solvent. The hydrocarbon solvent employed has a boiling range of from 312° to 390° F. and a flash point of about 116° F. This composition is employed for the treatment of soil of good nutrient content heavily infested with root-knot nematodes. At the time of treatment the soil contains about 20 percent by weight of water, the latter being about 90 percent of the field capacity. In the treating operations, the toxicant composition is injected into the soil in rows 12 inches apart, the injections being made at 4 inch intervals and at a depth of about 6 inches below the soil surface. The amount of composition employed is sufficient to supply 50 pounds of 2,3-dibromopropyl propargyl ether per acre-foot. Following the distribution the average soil temperature remains at about 62° F. for the period of the termination.

Ten days after treatment, the soil is seeded with tomatoes, the seeded soil being that positioned about six inches from the loci of treatment. Untreated check plots are also planted with tomato seeds. During the subsequent growing period there is observed no adverse effect upon the germination and growth of seedlings attributable to the presence of residual toxicant. Eight weeks after seeding, the plants are lifted from the soil and their roots washed and examined for gall formation attributable to nematode attack. The examination indicates a substantially complete control of nematodes in the treated soil with heavy infestation in the check plots.

Example 5

A water dispersible concentrate composition containing ninety parts by weight of 2,3-dibromopropyl propyl ether and ten parts by weight of Tween 20 is dispersed in water to prepare an aqueous composition containing about 100 pounds of 2,3-dibromopropyl propyl ether per 200 gallons of ultimate mixture. The latter composition while under agitation is metered into irrigation water at a pump outlet at the rate of 2 gallons per 1000 gallons of irrigation water. The water is in a state of turbulent flow as it comes from the pump which provides for the thorough mixing of the toxicant therein. About one acre-inch of irrigation water is applied to land heavily infested with root-knot nematode to accomplish a wetting of the soil to a depth of about 6 inches. Ten days after treatment the soil is planted to tomatoes. Seven weeks after seeding, the plots are inspected and representative plants lifted from the soil and their roots examined for evidence of root-knot nematode disease. The examination indicates commercial control of the root-knot nematode in the treated soil with heavy infestation in the check plots.

Example 6

An acetone solution containing 0.5 gram of 2,3-dibromopropyl ethyl ether in 5 milliliters of acetone was dispersed in water to prepare aqueous compositions containing 10, 20, 40, 80 and 160 parts by weight of toxicant per million parts of ultimate mixture. These compositions were employed for the treatment of areas of sandy loam soil of good nutrient content heavily infested with root-knot nematodes. In the treating operations, the compositions were applied to the soil as a drench and at a rate of about 5.8 acre-inches of aqueous composition per acre to supply 12.6, 25.2, 50.5, 101 and 202 pounds, respectively, of 2,3-dibromopropyl ethyl ether per acre. Seven days after treatment, sections of soil were taken from the treated areas at various depths below the soil surface, the sections placed in seed beds and the beds thereafter planted with cucumber seeds. In an exactly analogous fashion, sections of soil were taken from areas of similarly infested but untreated soil, and the sections placed in seed beds and planted with cucumber seeds to serve as checks. Seven weeks after seeding the plants were lifted from the soil their roots washed and the latter examined for galls attributable to root-knot nematode disease. The depth below the soil surface at which the sections of soil were taken and the percent control of nematodes obtained in these soil sections are set forth in the following table:

| Depth Below Soil Surface in Inches at Which the Section of Soil Was Taken | Percent Control of Root-Knot Nematodes at the Indicated Dosages Expressed in Pounds Per Acre | | | | |
|---|---|---|---|---|---|
| | 12.6 | 25.2 | 50.5 | 101 | 202 |
| 1–3 | 91 | 77 | 99 | 100 | 100 |
| 3–6 | 76 | 100 | 100 | 100 | 100 |
| 9–12 | 76 | 85 | 100 | 100 | 100 |

At the time of observation, the check plants were found to have their roots covered with galls attributable to root-knot nematodes.

Example 7

An acetone solution containing 0.5 gram of 2,3-dibromopropyl allyl ether in 5 milliliters of acetone was dispersed in water to prepare aqueous compositions containing 40, 80 and 160 parts by weight of toxicant per million parts of ultimate mixture. These compositions were employed for the treatment of areas of sandy loam soil of good nutrient content heavily infested with root-knot nematodes. In the treating operations, the compositions were applied to the soil as a drench and at a rate of about 5.8 acre-inches of aqueous composition per acre to supply 50.5, 101 and 202 pounds, respectively of 2,3-dibromopropyl allyl ether per acre. Seven days after treatment, sections of soil were taken from the treated areas at various depths below the soil surface, the sections placed in seed beds and the beds thereafter planted with cucumber seeds. In an exactly analogous fashion, sections of soil were taken from areas of similarly infested but untreated soil, and the sections placed in seed beds and planted with cucumber seeds to serve as checks. Seven weeks after seeding, the plants were lifted from the soil, their roots washed and the latter examined for galls attributable to root-knot nematode disease. The depth below the soil surface at which the sections of soil were taken and the percent control of nematodes obtained in these soil sections are set forth in the following table:

| Depth Below Soil Surfaces in Inches at Which the Section of Soil Was Taken | Percent Control of Root-Knot Nematodes at the Indicated Dosages | | |
|---|---|---|---|
| | 50.5 | 101 | 202 |
| 1-3 | 100 | 100 | 100 |
| 3-6 | 100 | 100 | 100 |
| 9-12 | 100 | 67 | 99 |

At the time of the observations, the check plants were found to have their roots covered with galls attributable to root-knot nematodes.

The ether compounds as employed in accordance with the teachings of the present invention may be prepared by known methods and conveniently by a Williamson synthesis. In such synthesis sodium 2,3-dibromopropylate is reacted with allyl bromide, propargyl bromide or a suitable alkyl bromide to produce the desired ether compound.

I claim:

1. A method of treating nematode infested soil to control soil-dwelling organisms and to improve its plant growing properties which comprises introducing into said soil a nematocidal concentration of an active agent effective to improve said properties, the active agent being an ether compound having the formula

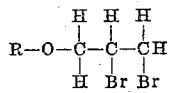

wherein R represents a member of the group consisting of lower alkyl, allyl and propargyl.

2. A method as claimed in claim 1 wherein the active ingredient is 2,3-dibromopropyl allyl ether.

3. A method as claimed in claim 1 wherein the active ingredient is 2,3-dibromopropyl methyl ether.

4. A method as claimed in claim 1 wherein active ingredient is 2,3-dibromopropyl ethyl ether.

5. In the practice of agricultural economy for the control of soil-dwelling organisms, the method which comprises impregnating nematode infested soil with an ether compound in the amount of at least 2 parts by weight per million parts by weight of soil, the ether compound having the formula

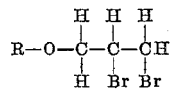

wherein R represents a member selected from the group consisting of lower alkyl, allyl and propargyl.

6. In the practice of plant husbandry for the control of soil-dwelling organisms, the method which comprises impregnating nematode infested soil with a composition comprising an ether compound in admixture with a soil treating adjuvant, the ether compound having the formula

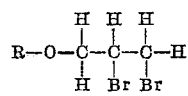

wherein R represents a member selected from the group consisting of lower alkyl, allyl and propargyl, and the impregnation being carried out so as to supply at least 2 parts by weight of the ether compound per million parts by weight of soil.

7. A composition which comprises as an active nematocidal ingredient an ether compound having the formula $$R\!-\!O\!-\!CH_2\!-\!CHBr\!-\!CH_2Br$$

wherein R represents a member of the group consisting of lower alkyl, allyl and propargyl, in intimate admixture with an emulsifying agent and said adjuvant is employed in an amount of from 1 to 20 percent by weight of said composition.

8. A composition which comprises as an active nematocidal ingredient an ether compound having the formula $$R\!-\!O\!-\!CH_2\!-\!CHBr\!-\!CH_2Br$$

wherein R represents a member of the group consisting of lower alkyl, allyl and propargyl, in intimate admixture with a petroleum distillate and said adjuvant is employed in an amount from about 15 to 90 percent by weight of said composition.

References Cited in the file of this patent

UNITED STATES PATENTS 2,577,453   Crocker _____ Dec. 4, 1951

OTHER REFERENCES

Frear: "Catalogue of Insecticides and Fungicides," pub. by Chronica Botanica Co., Waltham, Mass., 1947, p. 133.